UNITED STATES PATENT OFFICE.

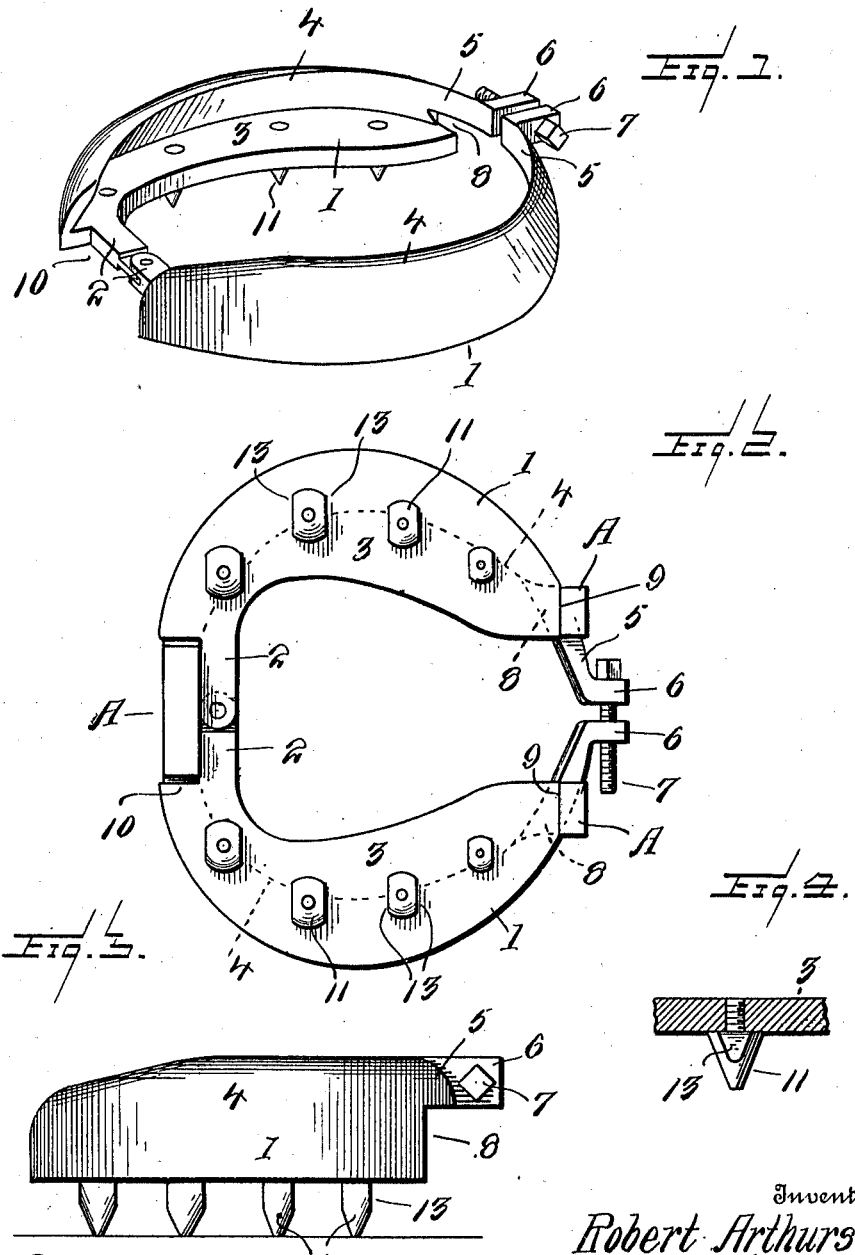

ROBERT ARTHURS, OF PITTSBURG, PENNSYLVANIA.

ANTISLIPPING DEVICE.

988,847.  Specification of Letters Patent.  Patented Apr. 4, 1911.

Application filed February 25, 1910. Serial No. 546,004.

*To all whom it may concern:*

Be it known that I, ROBERT ARTHURS, a citizen of the United States of America, residing at Pittsburg, in the county of Allegheny and State of Pennsylvania, have invented new and useful Improvements in Antislipping Devices, of which the following is a specification.

This invention relates to antislipping devices, and has for an object to provide a device of this character which may be conveniently applied to the hoof of a horse and which when in use may, if desired, be employed as an ordinary shoe.

In the drawing, forming a portion of this specification and in which like numerals of reference indicate similar parts in the several views:—Figure 1 is a detail perspective view of the device. Fig. 2 is a bottom plan view thereof showing the same in its applied position. Fig. 3 is a side view of the device. Fig. 4 is a detail section taken through one of the sections of the device showing one of the removable calks therefor.

My improved device consists of companion sections 1 which are formed with ear or tongue portions 2 pivoted together at their inner extremities to allow for the swinging movement of the two sections during their adjustment to the hoof of the animal. Each section is provided with a horizontally disposed main body portion 3 which is formed to provide a hoof-engaging flange 4. At the heel end of the shoe the flanges 4 are formed to provide extensions 5 having diametrically disposed lugs 6 for operatively receiving an adjusting screw 7. Each flanged portion 4 is notched as shown at 8 so that portions of the extensions 5 are disposed immediately above the rear extremities of the main body portions of the sections 1 and in spaced relation thereto to receive the heel ends of the ordinary horseshoe so that the calks A of the ordinary shoe will abut against the portions 9 of the heel sections. This construction is such that I not only provide for the attachment of the device on the animal on whose hoof is applied the ordinary horseshoe but as described and shown it will be seen that the device can be conveniently and effectively applied to the hoof without the ordinary shoe and the device in such instance fully meets the requirements for an effective shoe of durable form which can be conveniently applied to the animal without requiring the services of a skilled horseshoer. It may be stated that the main body portions 3 of the sections 1 are formed adjacent to the hinged joint to provide a recess 10 for the reception of the toe calk of an ordinary shoe.

Each section 1 is provided upon its lower surface with an arcuate series of removable calks 11 having threaded shank portions engaged in correspondingly formed passages in the main body portions of the sections as shown in Fig. 4 of the drawing. The calks are of substantially cone-form and they are provided upon opposite sides with flat faces 13 whereby the calks may be conveniently manipulated by a wrench or suitable tool when it is desired to attach them to or remove them from their respective sections. It may be stated that the calks are uniform in length, those nearest the toe end being somewhat larger than those nearest the heel end of the device.

I claim:

An antislipping device for attachment to horseshoes comprising hingedly connected sections having their toe ends formed to provide a recess for the reception of the toe calk of the shoe, the said sections each having a hoof-embracing flange, the said flanges being undercut at the heel extremities of the sections and formed with overhanging portions overlying the heel ends of the shoe, the said overhanging portions having rearwardly extending ears therein, a fastening device adjustable in the ears to clamp the sections to the hoof, the hinge of the sections being located directly at the rear of the center of the said recess for the reception of the toe calk so that the toe calk will span the joint of the hinge to brace the same, and depending calks secured to the said sections on the undersides thereof.

In testimony whereof I affix my signature in presence of two witnesses.

ROBERT ARTHURS.

Witnesses:
 W. A. MORTEN,
 DE WALDT J. HICKS.

Copies of this patent may be obtained for five cents each, by addressing the "Commissioner of Patents, Washington, D. C."